United States Patent
Chen et al.

(10) Patent No.: US 11,604,552 B1
(45) Date of Patent: Mar. 14, 2023

(54) METAL MESH STRUCTURE

(71) Applicant: HENGHAO TECHNOLOGY CO., LTD., Hsin-chu County (TW)

(72) Inventors: Yu-Tung Chen, Hsinchu County (TW); Shan-Chen Huang, Taoyuan (TW); Yu-Yuan Yeh, Miaoli County (TW)

(73) Assignee: HENGHAO TECHNOLOGY CO., LTD., Hsin-chu County (TW)

( * ) Notice: Subject to any disclaimer, the term of this patent is extended or adjusted under 35 U.S.C. 154(b) by 0 days.

(21) Appl. No.: 17/700,453

(22) Filed: Mar. 21, 2022

(30) Foreign Application Priority Data

Sep. 24, 2021 (TW) .................................. 110135488

(51) Int. Cl.
*G06F 3/044* (2006.01)

(52) U.S. Cl.
CPC .. *G06F 3/0446* (2019.05); *G06F 2203/04112* (2013.01)

(58) Field of Classification Search
USPC ......................................................... 345/173
See application file for complete search history.

(56) References Cited

U.S. PATENT DOCUMENTS

2020/0201485 A1 6/2020 Moon

FOREIGN PATENT DOCUMENTS

| CN | 113157149 A | 7/2021 |
|----|-------------|--------|
| TW | M481453 U | 7/2014 |
| WO | WO-2022071063 A1 * | 4/2022 |

* cited by examiner

*Primary Examiner* — Deeprose Subedi
(74) *Attorney, Agent, or Firm* — Winston Hsu (57) ABSTRACT

A metal mesh structure includes at least one first wire extending along a first direction and at least one second wire extending along a second direction different from the first direction. The at least one first wire includes a first portion, a second portion and a first bending portion connected between the first portion and the second portion. The first bending portion crosses the at least one second wire to form a node. An extending line of the first portion along the first direction passes through the node and is overlapped with the second portion. A first included angle is included between the first direction and the second direction, and a second included angle is included between the first bending portion and the at least one second wire, wherein the first included angle is different from the second included angle, and the second included angle is 90 degrees.

10 Claims, 5 Drawing Sheets

METAL MESH STRUCTURE

BACKGROUND OF THE INVENTION

1. Field of the Invention

The present invention relates to a metal mesh structure, and more particularly to a metal mesh structure having a specific wire design.

2. Description of the Prior Art

The metal mesh structure is a common form of touch electrodes and can be applied to display devices. For example, the metal mesh structure can serve as the touch electrodes in the display device to provide the touch function of the display device. Currently, the metal mesh structure may for example be formed through photolithography and etching processes. However, after the etching process, the area of the node of the metal mesh structure may be excessive large, thereby affecting the display performance of the display device when the metal mesh structure is applied to the display device. Accordingly, to improve the design of the metal mesh structure for reducing the influence of the metal mesh structure on the display effect is still an important issue in the present field.

SUMMARY OF THE INVENTION

A metal mesh structure is provided by the present invention, wherein the metal mesh structure includes first wires and second wires extending along two different directions, respectively, and the first wires can crosses the second wires to form nodes. In the metal mesh structure of the present invention, the first wires and the second wires at the nodes can be designed, such that the included angle between the first wire and the second wire at the node can be a right angle. Therefore, the area of the node can be reduced, and the influence of the nodes on the display effect of the display device can be reduced when the metal mesh structure of the present invention is applied to the display device.

In some embodiments, a metal mesh structure is provided by the present invention. The metal mesh structure includes at least one first wire extending along a first direction and at least one second wire extending along a second direction different from the first direction. The first wire includes a first portion, a second portion and a first bending portion connected between the first portion and the second portion. The first bending portion crosses the second wire to form a node, and an extending line of the first portion along the first direction passes through the node and is overlapped with the second portion. A first included angle is included between the first direction and the second direction, and a second included angle is included between the first bending portion and the second wire, wherein the first included angle is different from the second included angle, and the second included angle is 90 degrees.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The drawings described herein are for explanatory purpose only, and are not intended to limit the scope of the present invention. In addition, the shape and proportional size of each component in the drawings are only exemplary to help the understanding of the present invention, and do not specifically limit the shape and proportional size of each component of the present invention. Under the teaching of the present invention, the present invention can be implemented by those skilled in the art with various possible shapes and proportional sizes according to specific conditions.

DETAILED DESCRIPTION

The details of the present invention can be understood clearly through combination of the drawings and the description of the specific embodiments of the present invention. However, the specific embodiments of the present invention described herein are only used to explain the purpose of the present invention, which do not limit the scope of the present invention. Under the teaching of the present invention, any possible modification based on the present invention can be conceived by those skilled in the art, and they should be regarded as belonging to the scope of the present invention.

The present invention may be understood by reference to the following detailed description, taken in conjunction with the drawings as described below. It is noted that, for purposes of illustrative clarity and being easily understood by the readers, various drawings of this disclosure simply show a portion of the electronic device, and certain elements in various drawings may not be drawn to scale. In addition, the number and dimension of each element shown in drawings are only illustrative and are not intended to limit the scope of the present invention.

Certain terms are used throughout the description and following claims to refer to particular elements. As one skilled in the art will understand, manufacturers may refer to an element by different names. This document does not intend to distinguish between elements that differ in name but not function.

In the following description and in the claims, the terms "include", "comprise" and "have" are used in an open-ended fashion, and thus should be interpreted to mean "include, but not limited to . . . ".

It should be noted that the technical features in different embodiments described in the following can be replaced, recombined, or mixed with one another to constitute another embodiment without departing from the spirit of the present disclosure.

Figure 1:
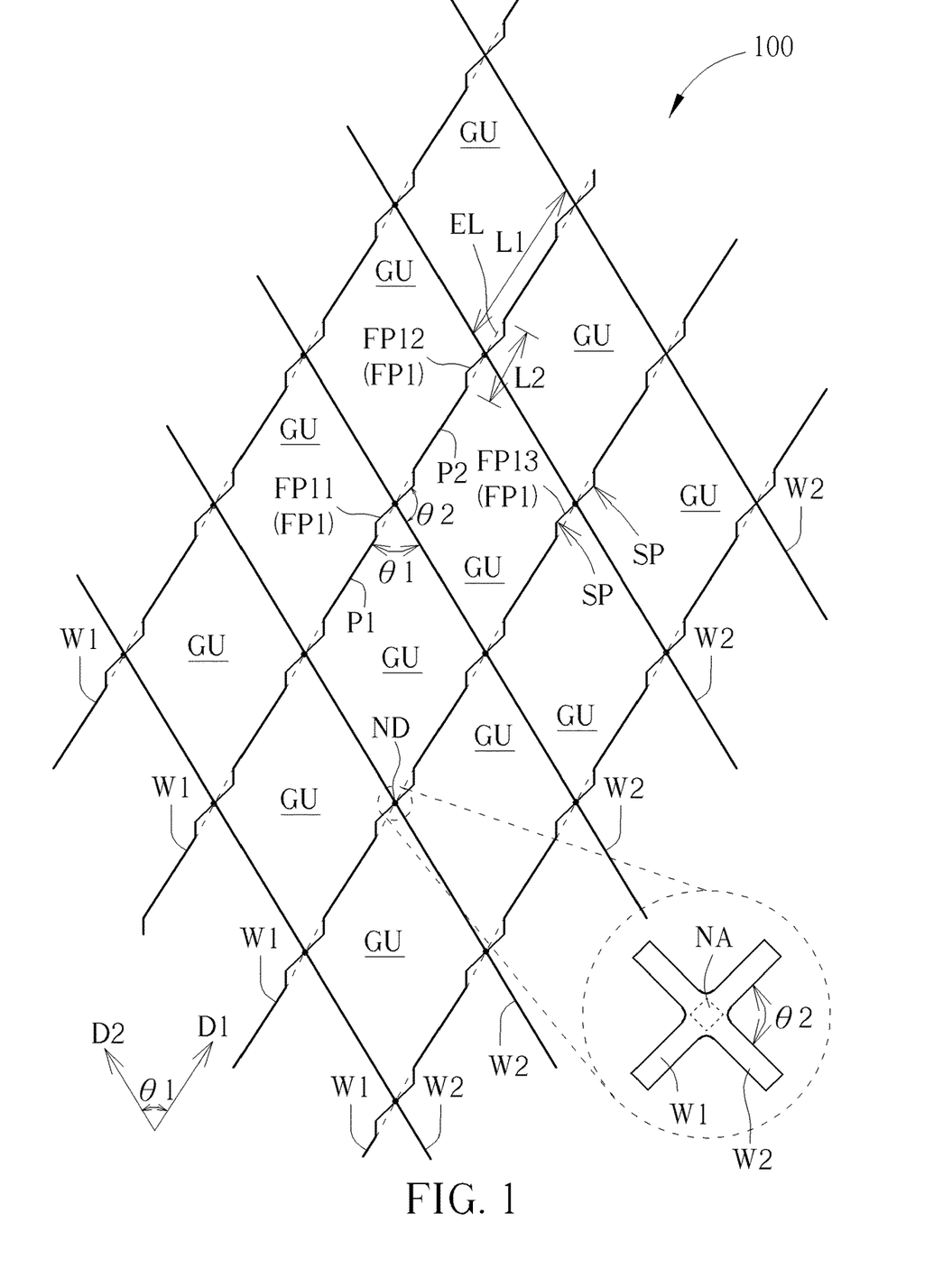
FIG. 1 schematically illustrates a top view of a metal mesh structure according to a first embodiment of the present invention.

Referring to FIG. 1, FIG. 1 schematically illustrates a top view of a metal mesh structure according to a first embodiment of the present invention. The metal mesh structure 100 of the present invention may for example serve as a touch sensing member and be applied to various electronic devices, such as the display device, but not limited thereto. For example, the metal mesh structure 100 may be disposed in the display device as the touch member (for example, touch electrodes), thereby providing the touch function of the display device, but not limited thereto. According to the present embodiment, the metal mesh structure 100 may be formed of a plurality of first wires W1 and a plurality of second wires W2. In detail, the first wires W1 and the second wires W2 may respectively extend along different directions, and the first wires W1 may cross the second wires W2 to form a plurality of mesh units GU, wherein the plurality of mesh units GU compose the metal mesh structure 100 of the present invention, but not limited thereto. In the present embodiment, the first wires W1 may for example extend along a first direction D1, and the second wires W2 may for example extend along a second direction D2 different from the first direction D1. According to the present invention, the first direction D1 is not perpendicular to the second direction D2. In addition, the points of intersection of the first wires W1 and the second wires W2 form the nodes ND of the metal mesh structure 100. As shown in FIG. 1, each of the mesh units GU may include four nodes ND, or in other words, each of the mesh units GU may correspond to four nodes ND. It should be noted that the extending directions of the first wires W1 and the second wires W2 of the metal mesh structure 100 of the present invention are not limited to the first direction D1 and the second direction D2 shown in FIG. 1. In some embodiments, the extending directions of the first wires W1 and the second wires W2 may be adjusted according to the demands of the design of the metal mesh structure 100. The first wires W1 and the second wires W2 may include any suitable metal material such as gold, silver, copper, aluminum, tin, nickel, other suitable conductive materials or the combinations of the above-mentioned materials, but not limited thereto. The first wires W1 and the second wires W2 may be formed of the same metal layer. For example, a complete metal layer may be formed on a substrate at first, and then, the patterns of the first wires W1 and the second wires W2 may be defined through lithography and etching. The structural design of the first wires W1 and/or the second wires W2 of the present embodiment will be detailed in the following.

According to the present embodiment, a portion of the first wire W1 and/or the second wire W2 located at the node ND includes a bending design, or in other words, the first wire W1 and/or the second wire W2 includes the bending design at the position near the node ND, such that the portion of the first wire W1 and/or the second wire W2 includes a non-linear shape. In detail, as shown in FIG. 1, the first wire W1 includes a first bending portion FP1 at the node ND (i.e. corresponding to the position of the node ND), wherein the first bending portion FP1 may include any suitable non-linear shape. For example, the first bending portion FP1 of the present embodiment may be zigzag-shaped, or in other words, the first bending portion FP1 may include a zigzag-shaped wire, but not limited thereto. In addition, in the first wire W1 of the present embodiment, the linear portions located at two sides of the first bending portion FP1 may respectively be defined as the first portion P1 and the second portion P2 of the first wire W1. That is, a first wire W1 includes at least one first portion P1, at least one second portion P2 and at least one first bending portion FP1 connected between the first portion P1 and the second portion P2. In the present embodiment, a first wire W1 may include a plurality of first portions P1, a plurality of second portions P2 and a plurality of first bending portions FP1.

When a first wire W1 includes a plurality of first bending portions FP1, different first bending portions FP1 may define different first portions P1 and different second portions P2, wherein the first portion P1 and the second portion P2 defined through a first bending portion FP1 are respectively located at two sides of the first bending portion FP1. Specifically, the first portion P1 and the second portion P2 labeled in FIG. 1 may for example be defined through the first bending portion FP11 located there between, as mentioned above. The first portions P1 and the second portions P2 for other first bending portions FP1 can be defined in the same way, which will not be redundantly described.

As shown in FIG. 1, a first included angle θ1 is included between the extending direction (that is, the first direction D1) of the first wires W1 and the extending direction (that is, the second direction D2) of the second wires W2, wherein the first included angle θ1 may be the included angle between the extending line EL of the linear portions (such as the first portion P1 and the second portion P2) of the first wire W1 and the second wire W2, but not limited thereto. In another aspect, since the first wire W1 includes the first bending portion FP1 at the node ND in the present embodiment, the included angle of the first wire W1 and the second wire W2 at the node ND is the included angle between the first bending portion FP1 and the second wire W2, that is, the second included angle θ2 shown in FIG. 1. The second included angle θ2 is different from the first include angle θ1 between the extending direction (the first direction D1) of the first wire W1 and the extending direction (the second direction D2) of the second wire W2. Specifically, since the extending direction of the first bending portion FP1 of the first wire W1 and the extending direction (that is, the first direction D1) of the linear portions (such as the first portion P1 and the second portion P2) of the first wire W1 are different, the magnitude of the second included angle θ2 between the first wire W1 and the second wire W2 at the node ND may be adjusted through the first bending portion FP1, such that the second included angle θ2 can be different from the first included angle θ1. With the above-mentioned design, the second included angle θ2 can be varied to any suitable angular magnitude through the first bending portion FP1, which is not limited to the extending directions of the first wire W1 and the second wire W2 (such as the first direction D1 and the second direction D2).

Current metal mesh structure may for example be formed through photolithography and etching process. In detail, the pattern of the photomask may be defined according to the design layout of the metal mesh structure at first, and then, a metal layer can be exposed, and a photo-etching step may be performed to form the patterned metal mesh structure. However, during the exposure stage, the exposure light from the light source may be diffracted when passing through the photomask, such that the area of the node of the formed metal mesh structure may be greater than the expected area of the node. Therefore, when the current metal mesh structure is applied to the display device, the nodes may be observed by the users, thereby affecting the display effect of the display device. In order to reduce the influence of the nodes of the metal mesh structure on the display effect of the display device, the included angle of the first wire W1 and the second wire W2 of the metal mesh structure 100 at the node ND can be designed to be a right angle in the present embodiment. That is, the second included angle θ2 of the metal mesh structure 100 is 90 degrees in the present embodiment. Specifically, by designing the second included angle θ2 to be a right angle, the area of the node ND (for example, the node area NA shown in FIG. 1) formed of the point of intersection of the first wire W1 and the second wire W2 can be minimized. In other words, compared to the second included angle θ2 with other degrees, the node area NA of the node ND can be lower when the second included angle θ2 is 90 degrees. Therefore, when the metal mesh structure 100 is applied to the display device, since the node area NA of the node ND of the metal mesh structure 100 can be minimized by designing the second included angle θ2 to be 90 degrees, the situation that the display effect of the display device is affected due to the excessive large node area NA can be reduced, thereby improving the performance of the display device including the metal mesh structure 100.

As mentioned above, the second included angle θ2 is the included angle between the first bending portion FP1 of the first wire W1 and the second wire W2 in the present embodiment. Therefore, the second included angle θ2 can be adjusted through the design of the first bending portion FP1, such that the degree of the second included angle θ2 is not limited to the extending directions of the first wire W1 and the second wire W2. In other words, through the design of the first bending portion FP1, the second included angle θ2 between the first wire W1 and the second wire W2 at the node ND can be maintained at 90 degrees without limiting the extending directions of the first wire W1 and the second wires W2. Accordingly, in the present embodiment, although the second included angle θ2 is designed to be 90 degrees, the first included angle θ1 between the extending directions of the first wire W1 and the second wire W2 may be any suitable magnitude, according to the design of the wires of the metal mesh structure 100. In other words, the first wire W1 and the second wire W2 of the metal mesh structure 100 of the present embodiment may extend in any directions (or may have any suitable first included angle θ1) according to the demands of the design, and the second included angle θ2 between the first wire W1 and the second wire W2 at the node ND can be 90 degrees through the first bending portion FP1 at the same time. Therefore, the node area NA of the node ND of the metal mesh structure 100 can be minimized without affecting the design flexibility of the metal mesh structure 100, thereby reducing the influence of the nodes ND on the display effect of the display device. In the present embodiment, according to the extending directions of the first wire W1 and the second wire W2, the first included angle θ1 may for example range from 50 to 130 degrees (that is, 50°≤first included angle) θ1≤130°, but not limited thereto. In addition, since the first included angle θ1 and the second included angle θ2 are different in the present embodiment, the first included angle θ1 may be an acute angle greater than or equal to 50 degrees or an obtuse angle less than or equal to 130 degrees, but the present embodiment is not limited thereto. In some embodiments, the first included angle θ1 and the second included angle θ2 may be the same, that is, the first included angle θ1 may be 90 degrees.

The bending portion can be formed by changing a portion of the wire located at the node from the initial linear shape to a bending shape in the present embodiment. In detail, as shown in FIG. 1, the first wire W1 includes the first portion P1 and the second portion P2 with linear shapes, wherein the first portion P1 and the second portion P2 have the common extending line EL, and in the present embodiment, the first bending portion FP1 may be formed by performing a bending design on the portion of the first wire W1 located at the node ND, but not limited thereto. In other words, after the first bending portion FP1 is formed, the first bending portion FP1 is not parallel to the extending line EL. The extending line EL can be regarded as the extending line of the first portion P1 (or the second portion P2) in the first direction D1 in the present embodiment, and the extending line EL may overlap the first portion P1 and the second portion P2.

Taking the first bending portion FP12 shown in FIG. 1 as an example, the first bending portion FP12 may have a projection length L2 in the first direction D1, wherein the projection length L2 can be regarded as the length of a straight line segment of the first wire W1 used to form the first bending portion FP12. In other words, the first bending portion FP12 replace the straight line segment, with a length the same as the projection length L2, of the first wire W1 at the node ND. In addition, the projection length L2 can also be regarded as the length of the extending line EL in the first direction D1. In another aspect, the mesh units GU formed by the intersection of the first wires W1 and the second wires W2 may include a side length L1, wherein the side length L1 may for example be defined as the length of the first wire W1 in one mesh unit GU in the first direction D1 (as shown in FIG. 1) or the length of the second wire W2 in one mesh unit GU in the second direction D2. In some embodiments, the length of the first wire W1 in the mesh unit GU and the length of the second wire W2 in the mesh unit GU may be the same, and the mesh unit GU may be diamond-shaped or have a diamond-liked shape, but not limited thereto. According to the present embodiment, a ratio of the projection length L2 to the side length L1 may range from 0.01 to 0.1 (that is, $0.01 \leq L2/L1 \leq 0.1$), but not limited thereto. The ratio of the projection length L2 to the side length L1 may for example represent the proportion of the first bending portion FP1 in the first wire W1. By making the ratio of the projection length L2 to the side length L1 in the above-mentioned range, the effect of minimizing the node area NA can be achieved while reducing the influence of the first bending portion FP1 on the application flexibility of the metal mesh structure 100. In detail, when the ratio of the projection length L2 to the side length L1 is greater than 0.1, the proportion of first bending portion FP1 in the first wire W1 may be greater, such that the pattern of the metal mesh structure 100 may be complicate, thereby affecting the application flexibility of the metal mesh structure 100 when the metal mesh structure 100 is applied to the display device; when the ratio of the projection length L2 to the side length L1 is lower than 0.01, the size of the first bending portion FP1 may be reduced, such that the effect of minimizing the node area NA of the node ND is not significant.

As mentioned above, in the metal mesh structure 100 of the present embodiment, the portion of the first wire W1 at the node ND may have a bending design to form the first bending portion FP1, or in other words, the first bending portion FP1 may replace the straight line segment (shown as the extending line EL) of the first wire W1 at the node ND, wherein the first bending portion FP1 is perpendicular to the second wire W2 so as to minimize the node area NA of the node ND. According to the present embodiment, the node ND formed by the intersection of the first bending portion FP1 and the second wire W2 and the point of intersection of the extending line EL and the second wire W2 may be located in the same position, wherein the extending line EL can pass through the node ND and is overlapped with the first portion P1 and the second portion P2, but not limited thereto. In other words, even though the first wire W1 includes the bending design to form the first bending portion FP1, the position of the node ND is not changed. That is, the structure of the first bending portion FP1 does not affect the position of the node ND, and the design of including the first bending portion FP1 at the node ND would not increase the number of the nodes ND, either. According to the present embodiment, taking the first bending portion FP13 shown in FIG. 1 as an example, in order to achieve the purpose of not changing the position of the node ND, the first bending portion FP13 may for example include at least two sub portions SP respectively located at two sides of the extending line EL, wherein the sub portions SP located at two sides of the extending line EL may be in contact with each other at the node ND, but not limited thereto. In the present embodiment, since the design of including the first bending portion FP1 in the first wire W1 does not change the positions of the nodes ND or increase the number of the nodes ND, the effect of the first bending portion FP1 on the structure of the metal mesh structure 100 can be reduced. Therefore, when the metal mesh structure 100 is applied to the display device, the possibility that the display effect of the display device is affected by the structural change of the metal mesh structure 100 can be reduced, thereby improving the application flexibility of the metal mesh structure 100.

Figure 2:
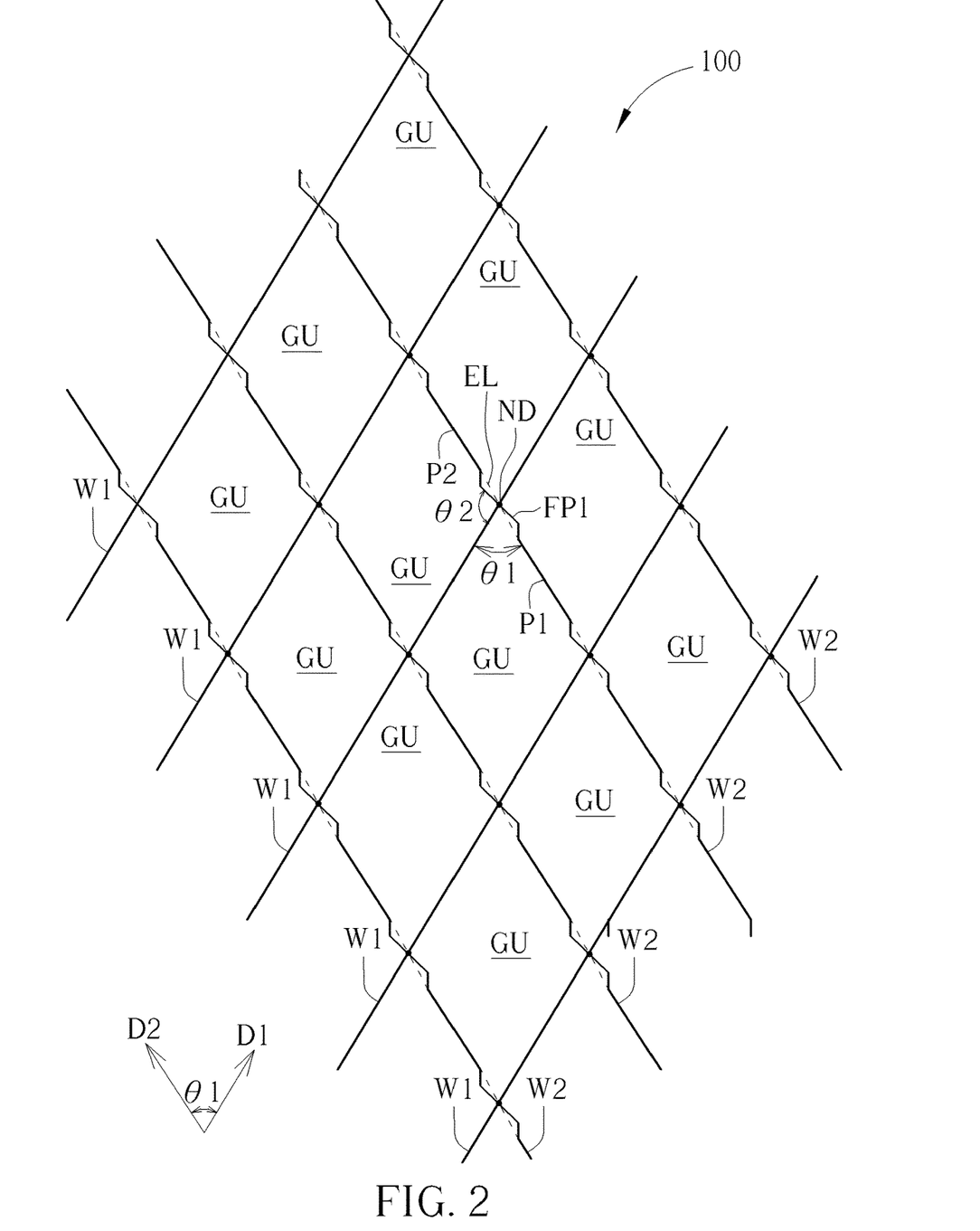
FIG. 2 schematically illustrates a top view of a metal mesh structure according to a variant embodiment of the first embodiment of the present invention.

It should be noted that although the first wire W1 including the first bending portion FP1 shown in FIG. 1 is taken as an example to illustrate the structural features of the present embodiment, and the present embodiment is not limited thereto. Referring to FIG. 2, FIG. 2 schematically illustrates a top view of a metal mesh structure according to a variant embodiment of the first embodiment of the present invention. As shown in FIG. 2, in the present variant embodiment, the wire including the bending design in the metal mesh structure 100 is the second wire W2, and the first wire W1 can be linear, but not limited thereto. That is, the structural features of the second wire W2 in the present variant embodiment may refer to the structural features of the first wire W1 in the first embodiment mentioned above, and will not be redundantly described.

More embodiments of the present invention will be described in the following. In order to simplify the description, the same elements in the following embodiments would be labeled with the same symbol, and the features thereof will not be redundantly described. The differences between each of the embodiments will be described in detail in the following contents.

Figure 3:
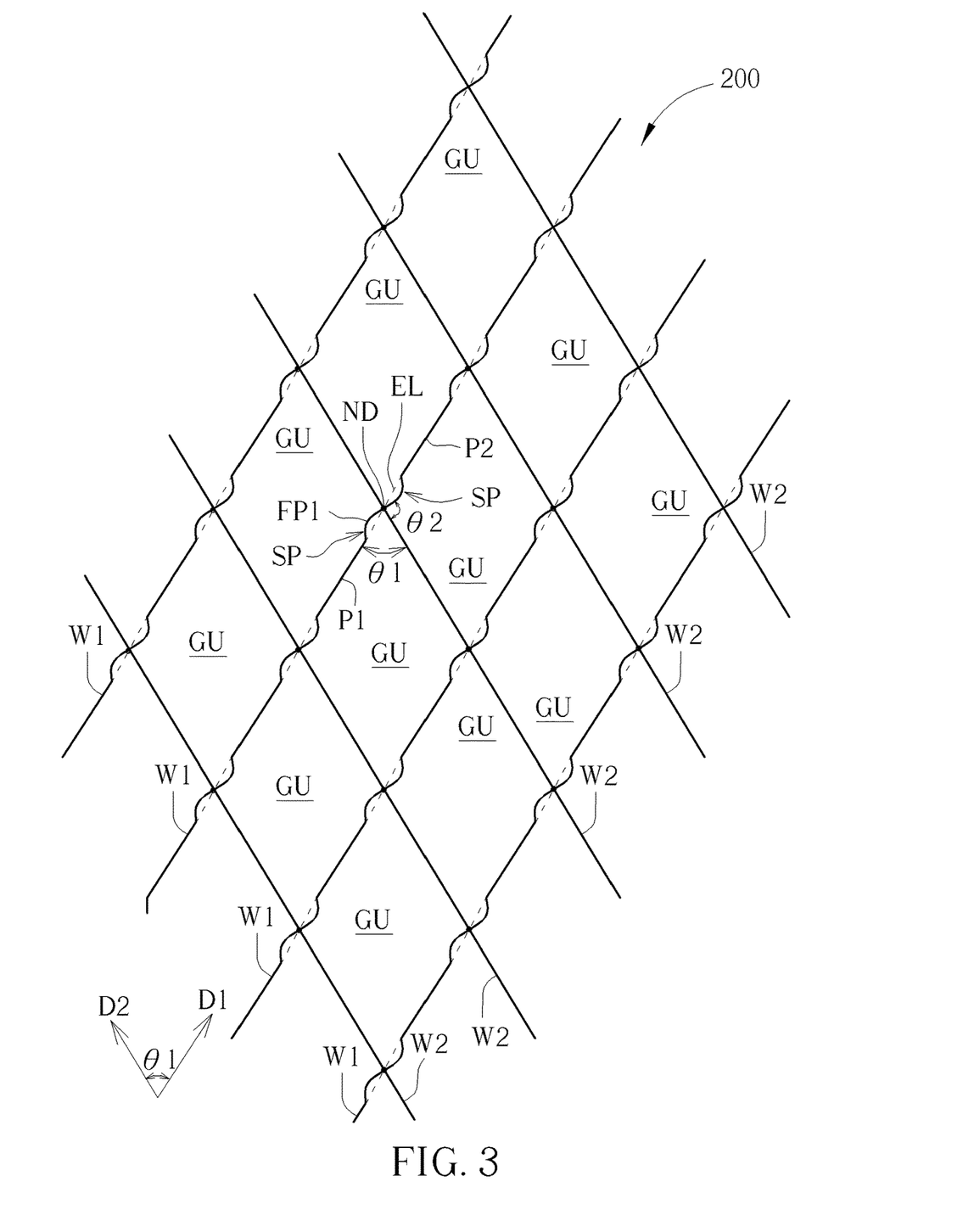
FIG. 3 schematically illustrates a top view of a metal mesh structure according to a second embodiment of the present invention.

Referring to FIG. 3, FIG. 3 schematically illustrates a top view of a metal mesh structure according to a second embodiment of the present invention. According to the present embodiment, the first bending portions FP1 of the first wires W1 in the metal mesh structure 200 may be arc-shaped, but not limited thereto. It should be noted that although the first bending portion FP1 is arc-shaped, the portion of the first bending portion FP1 crosses the second wire W2 may be linear, such that the first bending portion FP1 can be perpendicular to the second wire W2 (that is, the second included angle θ2 is 90 degrees). The other features of the metal mesh structure 200 of the present embodiment may refer to the contents in the above-mentioned first embodiment, and will not be redundantly described. In addition, the first bending portion FP1 of the present embodiment may include two sub portions SP respectively located at two sides of the extending line EL, wherein the two sub portions SP may for example be similar to a semi-circle or a wave. Therefore, the first bending portion FP1 of the present embodiment may for example be S-shaped, but not limited thereto. The two sub portions SP of the first bending portion FP1 may be in contact with each other at the node ND, and the node ND may for example be the inflection point of the arc-shaped first bending portion FP1 in the present embodiment, but not limited thereto. According to the present embodiment, since the first bending portion FP1 of the first wire W1 is arc-shaped, the influence of stress on the first bending portion FP1 can be reduced when the metal mesh structure 200 is applied to flexible or foldable display devices, thereby improving the yield of the metal mesh structure 200.

Figure 4:
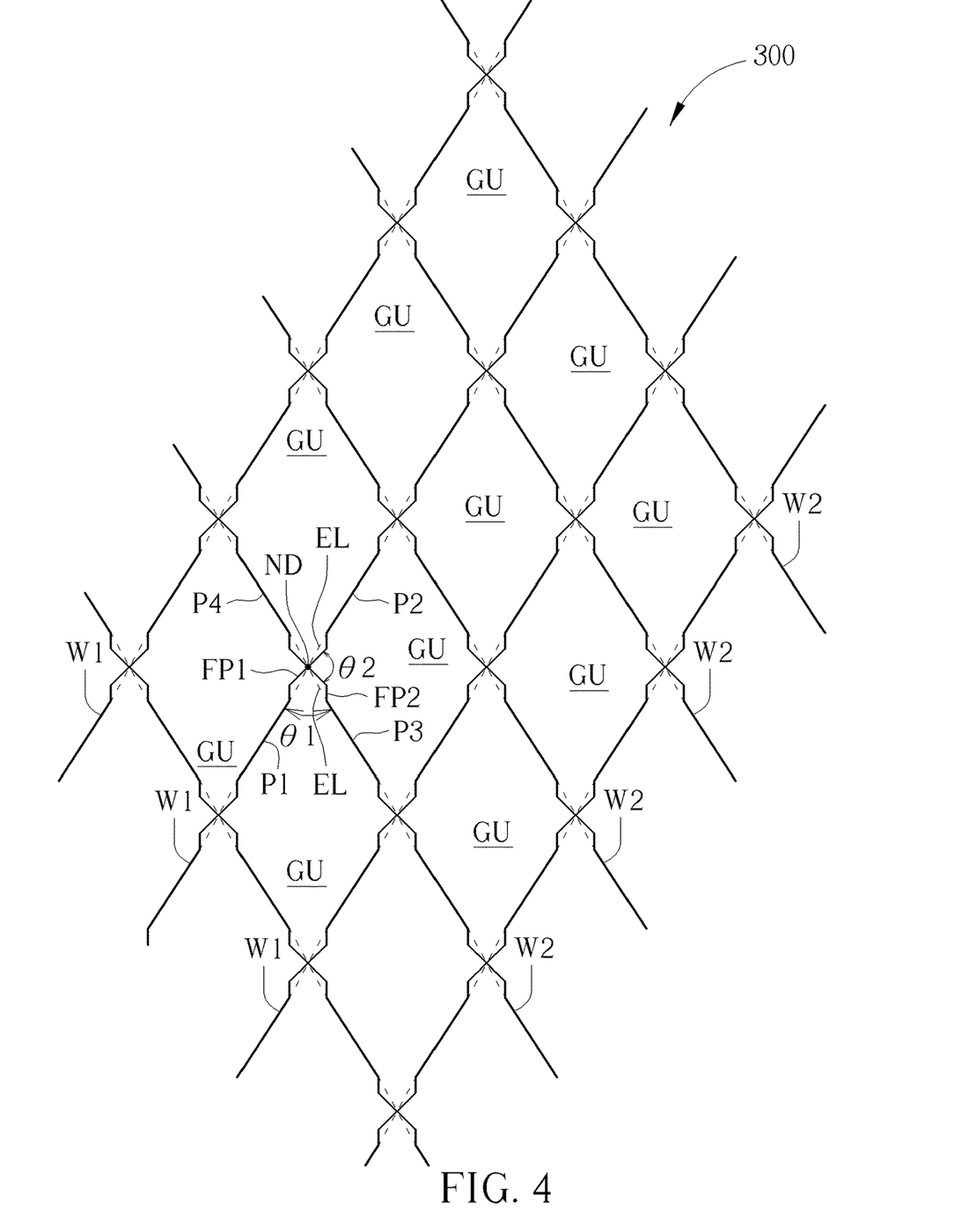
FIG. 4 schematically illustrates a top view of a metal mesh structure according to a third embodiment of the present invention.

Referring to FIG. 4, FIG. 4 schematically illustrates a top view of a metal mesh structure according to a third embodiment of the present invention. According to the present embodiment, the metal mesh structure 300 is formed by the intersection of the plurality of first wires W1 and the plurality of second wires W2, wherein a first wire W1 includes at least one first portion P1, at least one second portion P2 and at least one first bending portion FP1 connected between the first portion P1 and the second portion P2, and a second wire W2 includes at least one third portion P3, at least one fourth portion P4 and at least one second bending portion FP2 connected between the third portion P3 and the fourth portion P4. In the present embodiment, a first wire W1 may include a plurality of first portions P1, a plurality of second portions P2 and a plurality of first bending portions FP1, and a second wire W2 may include a plurality of third portions P3, a plurality of fourth portions P4 and a plurality of second bending portions FP2. That is, the first wires W1 and the second wires W2 both include the bending design in the present embodiment, but not limited thereto. The structures, materials, relationship and definitions of the third portion P3, the fourth portion P4 and the second bending portion FP2 in the present embodiment may respectively refer to the related descriptions of the first portion P1, the second portion P2 and the first bending portion FP1 in the first embodiment mentioned above, and will not be redundantly described. According to the present embodiment, the nodes ND of the metal mesh structure 300 may be formed by the intersections of the first bending portions FP1 and the second bending portions FP2, and the second included angles θ2 between the first wires W1 and the second wires W2 at the nodes ND may be the included angles between the first bending portions FP1 and the second bending portions FP2. In the present embodiment, the first bending portion FP1 and the second bending portion FP2 are perpendicular to each other at the intersection, such that the second included angle θ2 is 90 degrees. In addition, as shown in FIG. 4, similar to the first wire W1, the third portion P3 of the second wire W2 may include an extending line EL extending along the second direction D2, wherein the extending line EL may pass through the node ND and is overlapped with the fourth portion P4.

It should be noted that the shapes of the first bending portion FP1 of the first wire W1 and the second bending portion FP2 of the second wire W2 in the present embodiment are not limited to what is shown in FIG. 4, and may include any suitable shape according to the demands of the design of the metal mesh structure 300. For example, in some embodiments, the first bending portion FP1 may be zigzag-shaped which is shown in FIG. 1, and the second bending portion FP2 may be arc-shaped which is shown in FIG. 3, but not limited thereto.

Figure 5:
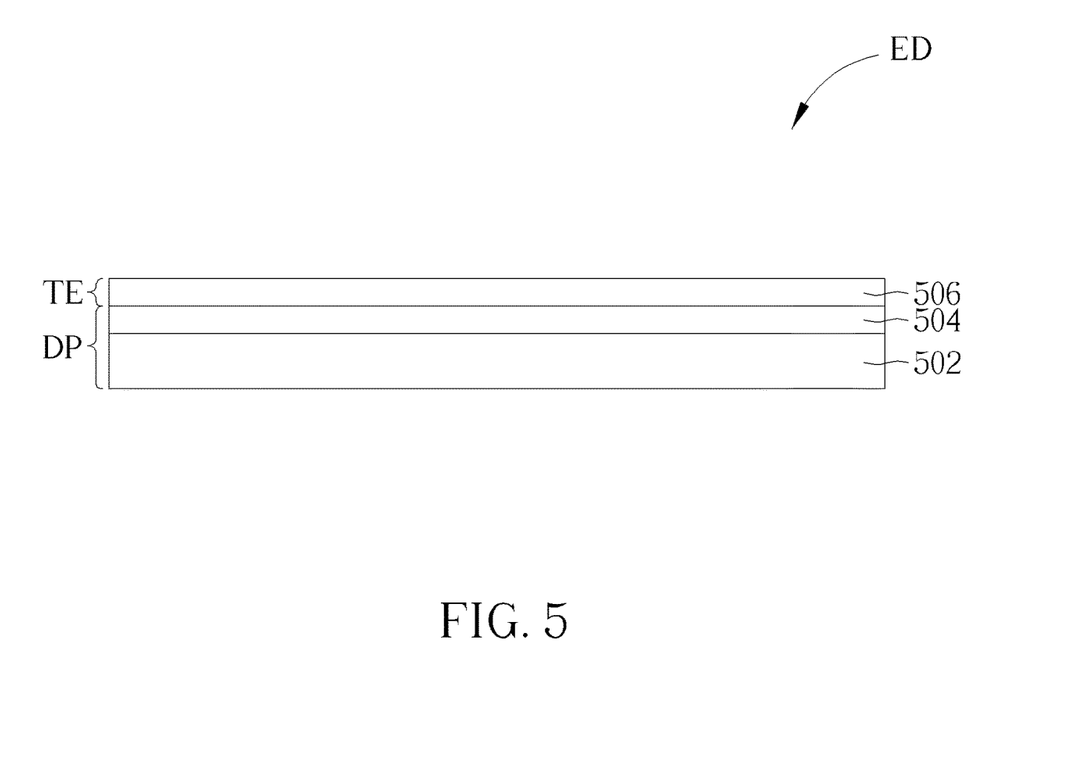
FIG. 5 schematically illustrates a cross-sectional view of a touch member in which the metal mesh structure of the present invention is included.

Referring to FIG. 5, FIG. 5 schematically illustrates a cross-sectional view of a touch member in which the metal mesh structure of the present invention is included. FIG. 5 shows an electronic device ED having a display panel DP and a touch member TE, wherein the display panel DP includes a substrate 502 and a display layer 504, and the touch member TE includes at least one metal mesh structure 506. The display layer 504 may include any suitable light emitting components, display components, light modulating components, driving components, switch components, wires and/or other suitable electronic components, such as light emitting diodes, liquid crystal materials, thin film transistors, capacitors and the like, but the present invention is not limited thereto. The metal mesh structure 506 may be any one of the metal mesh structures described above. For example, the metal mesh structure 506 may be one of the metal mesh structures 100, 200 and 300. The touch member TE may include a plurality of touch electrodes, and each of the touch electrodes may be composed of the metal mesh structure 506. The formation of the metal mesh structure 506 may be accomplished by thin film deposition technique and lithography and etching technique, which is similar to the thin film transistors. In addition, while forming the metal mesh structure 506, wires such as peripheral wires or touch wires may be formed of the same metal layer on the substrate 502 at the same time, but the present invention is not limited thereto. According to a variant embodiment of the present invention, the touch member TE may include one or more metal layers, and these metal layers may respectively form metal mesh structures of different layers. In addition, insulating layer(s) or insulating substrate(s) (not shown in figure) may be disposed between the metal mesh structure 506 and the display layer 504, such that the metal mesh structure 506 is not in contact with the electronic components in the display layer 504. In some other embodiments, the touch member TE may be disposed in the display layer 504, and the metal mesh structure 506 and some of the electronic components in the display layer 504 may be formed together, but the present invention is not limited thereto.

In summary, a metal mesh structure formed by the intersection of the first wires and the second wires is provided by the present invention, wherein the first wires and/or the second wires include the bending design at the nodes, such that the included angles between the first wires and the second wires at the nodes are 90 degrees, but the including angles between the extending directions of the first wires and the second wires are not 90 degrees. The areas of the nodes of the metal mesh structure can be minimized by making the included angles between the first wires and the second wires at the nodes be 90 degrees. Therefore, when the metal mesh structure is applied to the display device, the effect of nodes on the display effect can be reduced. In addition, since the bending design of the metal mesh structure of the present invention does not change the positions of the nodes or increase the number of the nodes, the possibility that the display effect of the display device is affected by the structural change of the metal mesh structure can be reduced, thereby improving the application flexibility of the metal mesh structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A metal mesh structure, comprising:
at least one first wire extending along a first direction, wherein the at least one first wire includes a first portion, a second portion and a first bending portion connected between the first portion and the second portion, wherein the first portion and the second portion are linear along the first direction; and
at least one second wire extending along a second direction different from the first direction;
wherein the first bending portion crosses the at least one second wire to form a node, and an extending line of the first portion along the first direction passes through the node and is overlapped with the second portion,
wherein an included angle between the first direction and the second direction is an acute angle or an obtuse angle, and another included angle between the first bending portion and the at least one second wire is 90 degrees.

2. The metal mesh structure of claim 1, wherein the first bending portion is zigzag-shaped.

3. The metal mesh structure of claim 1, wherein the first bending portion is arc-shaped.

4. The metal mesh structure of claim 1, wherein the included angle between the first direction and the second direction is the acute angle greater than or equal to 50 degrees or the obtuse angle less than or equal to 130 degrees.

5. The metal mesh structure of claim 1, wherein the first bending portion includes two sub portions respectively located at two sides of the extending line.

6. The metal mesh structure of claim 1, wherein the at least one first wire and the at least one second wire include metal materials.

7. The metal mesh structure of claim 1, wherein the at least one second wire includes a third portion, a fourth portion and a second bending portion connected between the third portion and the fourth portion, the first bending portion crosses the second bending portion to form the node, and an extending line of the third portion along the second direction passes through the node and is overlapped with the fourth portion.

8. The metal mesh structure of claim 7, wherein the first bending portion and the second bending portion intersect at the node and are perpendicular to each other.

9. The metal mesh structure of claim 1, wherein the metal mesh structure includes a plurality of first wires and a plurality of second wires, the plurality of first wires cross the plurality of second wires to form a plurality of mesh units and a plurality of nodes, and each of the plurality of mesh units includes four of the plurality of nodes.

10. The metal mesh structure of claim 9, wherein each of the plurality of mesh units includes a side length, the first bending portion includes a projection length on the first direction, and a ratio of the projection length to the side length ranges from 0.01 to 0.1.

* * * * *